(12) United States Patent
Sato et al.

(10) Patent No.: US 7,845,683 B2
(45) Date of Patent: Dec. 7, 2010

(54) AIR BAG SYSTEM

(75) Inventors: Masahiro Sato, Saitama (JP); Seiji Kobata, Saitama (JP); Kanichi Fukuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 191 days.

(21) Appl. No.: 12/148,280

(22) Filed: Apr. 17, 2008

(65) Prior Publication Data
US 2008/0277907 A1 Nov. 13, 2008

(30) Foreign Application Priority Data
Apr. 25, 2007 (JP) ............................. 2007-116035

(51) Int. Cl.
*B60R 21/16* (2006.01)
*B60R 21/215* (2006.01)

(52) U.S. Cl. .................................. 280/743.2

(58) Field of Classification Search .............. 280/743.2; B60R 21/215, 21/16
See application file for complete search history.

(56) References Cited

U.S. PATENT DOCUMENTS

| | | | | |
|---|---|---|---|---|
| 5,221,108 | A * | 6/1993 | Hirabayashi | ............. 280/728.3 |
| 6,099,026 | A * | 8/2000 | Ando et al. | ............. 280/728.3 |
| 6,206,409 | B1 | 3/2001 | Kato et al. | |
| 6,471,238 | B2 * | 10/2002 | Ishikawa et al. | ......... 280/728.3 |
| 6,612,609 | B1 | 9/2003 | Rodriguez et al. | |
| 6,874,810 | B2 * | 4/2005 | Soderquist | ............... 280/728.3 |
| 7,445,239 | B2 * | 11/2008 | Okada et al. | ............. 280/743.1 |
| 7,568,730 | B2 * | 8/2009 | Kwon | ...................... 280/743.2 |
| 2002/0020995 | A1 | 2/2002 | Abe et al. | |
| 2007/0138779 | A1 * | 6/2007 | Kwon | ...................... 280/743.2 |

FOREIGN PATENT DOCUMENTS

| | | |
|---|---|---|
| DE | 198 38 815 A1 | 3/1999 |
| DE | 101 51 197 A1 | 5/2002 |
| JP | 08-268198 | 10/1996 |
| JP | 2003-081046 | 3/2003 |
| JP | 3467114 | 8/2003 |

* cited by examiner

*Primary Examiner*—Lesley D. Morris
*Assistant Examiner*—Joselynn Y. Sliteris
(74) *Attorney, Agent, or Firm*—Carrier, Blackman & Associates P.C.; William D. Blackman; Joseph P. Carrier

(57) ABSTRACT

An air bag system includes an air bag folded so that an occupant-restraining face of the air bag which restrains an occupant upon a deployment is hidden inside a central portion of the folded air bag, and a retaining member for covering said folded air bag. The air bag is deployed by breaking a breaking portion provided on the retaining member, whereupon the retaining member is opened so that it is divided into a plurality of deployment-inhibiting portions, and the plurality of deployment-inhibiting portions are brought into engagement with an upper block and a lower block of an outer peripheral portion of the air bag deployed from the folded state, respectively, thereby delaying the deployment of the outer peripheral portion. Therefore, the occupant-restraining face of the folded air bag can be deployed at the very first to effectively restrain the occupant.

18 Claims, 6 Drawing Sheets

AIR BAG SYSTEM

CROSS REFERENCE TO RELATED APPLICATIONS

The present invention priority under 35 USC §119 based on Japanese patent application No. 2007-116035 filed Apr. 25, 2007. The subject matter of this priority document is incorporated by reference herein.

FIELD OF THE INVENTION

The present invention relates to an air bag system comprising an air bag folded so that an occupant-restraining face for restraining an occupant upon deployment of the air bag is hidden inside a central portion of the folded air bag, and a retaining member for covering the folded air bag, wherein the air bag is deployed by breaking a breaking portion provided on the retaining member.

DESCRIPTION OF THE RELATED ART

There are air bag systems which are known, for example, Japanese Patent No. 3467114 and Japanese Patent Application Laid-open No. 2003-81046, in which a band-shaped wrapping member or packing strap is wound around an outer periphery of a folded air bag to prevent the form of the folded air bag from being broken, and when the air bag is to be deployed, a breaking portion provided on the wrapping member or on a packing strap is broken, thereby enabling the deployment of the air bag.

FIGS. 6A-C show the structures of the air bag systems described in the above Japanese Patent Documents and the operation during the deployment thereof.

FIG. 6A shows a state of the air bag 01 before the deployment thereof. The air bag 01 includes an upper block 01a and a lower block 01b, each of which has been folded in a zigzag fashion. A band-shaped retaining member 02 is wound around an outer periphery of the folded air bag 01 to prevent the form of the air bag 01 from being broken when the air bag is in the folded state. As shown in FIG. 6B, when the deployment of the air bag 01 is started, the breaking portion 02a of the retaining member 02 is broken by pressure generated during the deployment. As a result, as shown in FIG. 6C, the air bag which has been freed is deployed rearwards toward an occupant, but the upper block 01a and the lower block 01b of the air bag 01 are released and deployed toward the occupant while still in a folded state. For this reason, there is a possibility that the deployment of a central occupant-restraining face 01c of the air bag 01 to be brought into direct contact with the occupant is delayed, and an undeployed outer peripheral portion of the air bag 01 is brought into contact with the occupant before the occupant-restraining face 01c contacts the occupant and as a result, an effective occupant-restraining performance cannot be exhibited.

SUMMARY OF THE INVENTION

Accordingly, it is an object of the present invention to ensure that when the air bag in the folded state is deployed, the occupant can be reliably restrained by the occupant-restraining face of the air bag.

In order to achieve the above-mentioned object, according to a first feature of the present invention, there is provided an air bag system comprising an air bag folded so that an occupant-restraining face thereof which restrains an occupant upon deployment of the air bag is hidden inside a central portion of the folded air bag, and a retaining member which covers the folded air bag, wherein the retaining member includes a breaking portion along which the retaining member breaks, the air bag is deployed by breaking the breaking portion provided on the retaining member, and when the breaking portion breaks, the retaining member is opened so that it is divided into a plurality of deployment-inhibiting portions, and the plurality of deployment-inhibiting portions are brought into engagement with an outer peripheral portion of the air bag deployed from the folded state to delay the deployment of said outer peripheral portion.

An upper deployment-inhibiting portion 34f and a lower deployment-inhibiting portions 34g in an exemplary embodiment correspond to the deployment-inhibiting portions of the present invention.

With the arrangement of the first feature, when the folded air bag is deployed, the retaining member covering the air bag is opened so that the retaining member is divided into a plurality of deployment-inhibiting portions when the breaking portion is broken. Therefore, the deployment-inhibiting portions are brought into engagement with the outer peripheral portion of the air bag which is being deployed, whereby the occupant-restraining face hidden inside the central portion of the folded air bag is deployed prior to the outer peripheral portion. In this manner, the occupant can be effectively restrained by the occupant-restraining face of the air bag.

The above and other objects, features and advantages of the invention will become apparent from the following description of the preferred exemplary embodiments taken in conjunction with the accompanying drawings.

BRIEF DESCRIPTION OF THE DRAWINGS

FIGS. 1 to 5 show the exemplary embodiment of the present invention.

FIG. 1 is a perspective view of a front portion of a passengers' space in an automobile;

FIG. 2 is an enlarged sectional view taken along a line 2-2 in FIG. 1;

FIG. 3 is a view taken in a direction of an arrow 3 in FIG. 2 with portions broken away;

FIG. 4 is an exploded perspective view of an air bag, a retaining member and a fixing ring according to the exemplary embodiment of the present invention;

DETAILED DESCRIPTION OF PRESENT EMBODIMENT

The present invention will now be described by way of an exemplary embodiment with reference to the accompanying drawings.

Figure 1:
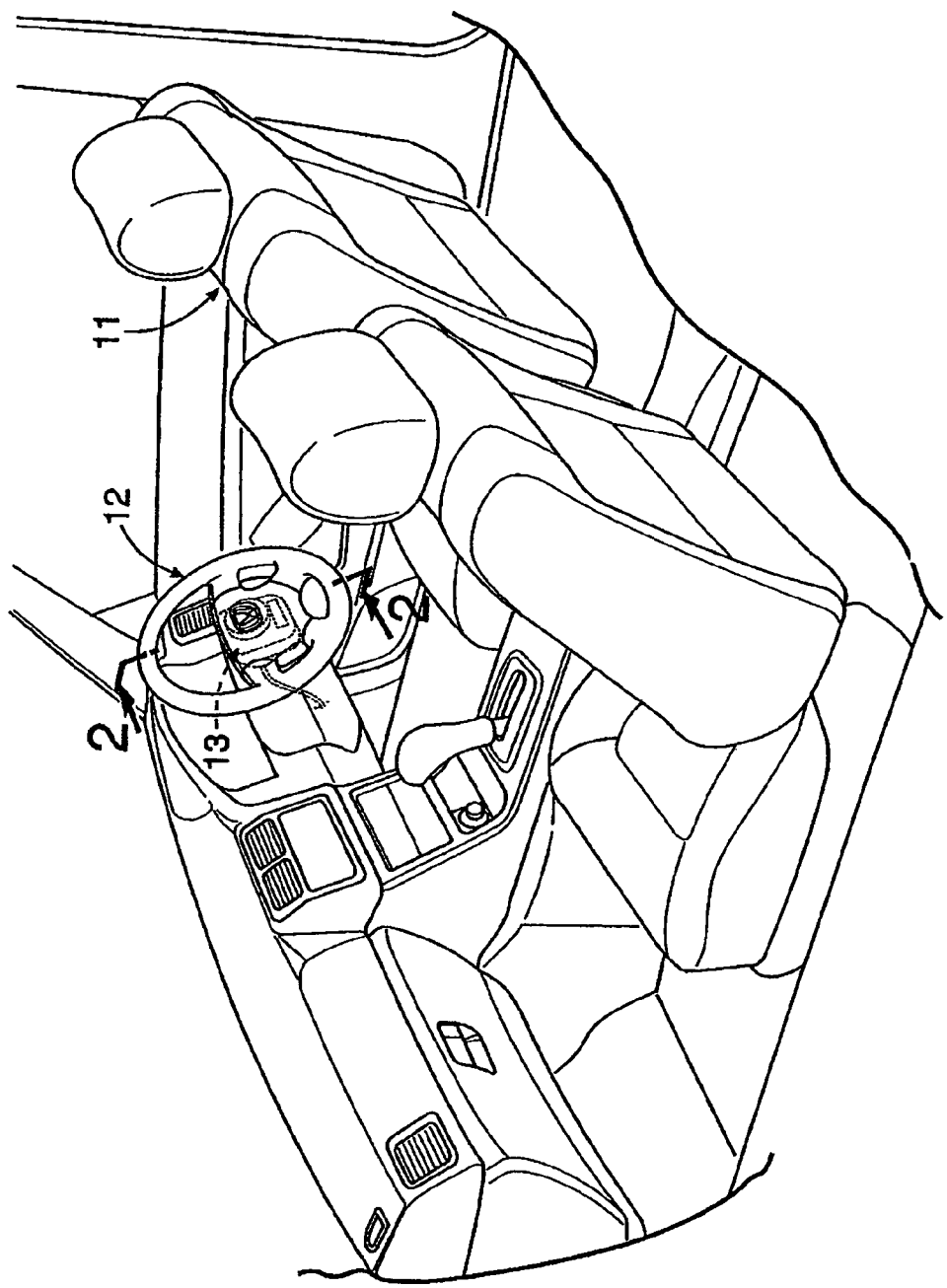

As shown in FIG. 1, an air bag module 13 for a person occupying a driver's seat 11 is contained within a steering wheel 12 disposed in front of the driver's seat 11.

Figure 2:
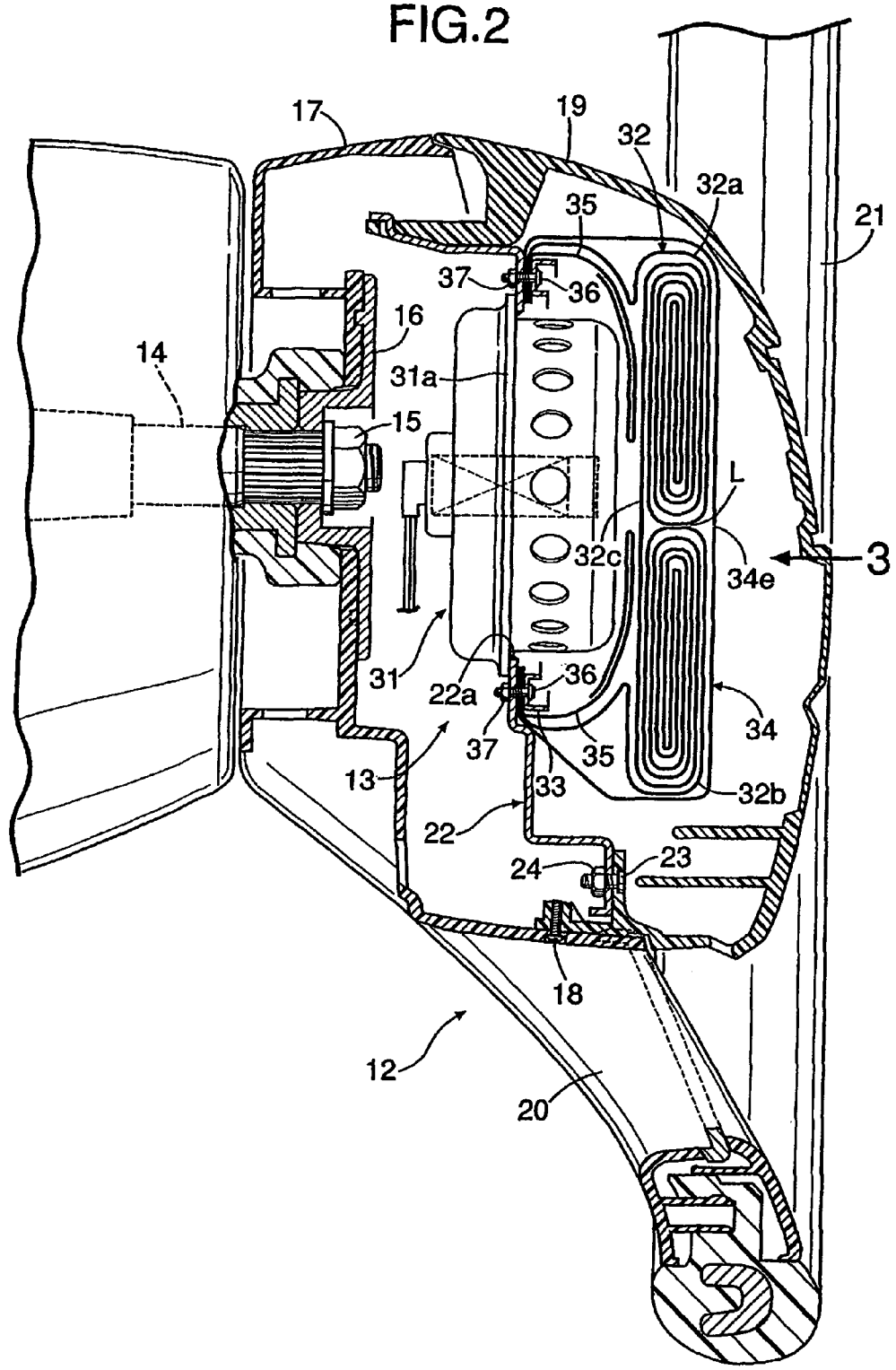
Figure 3:
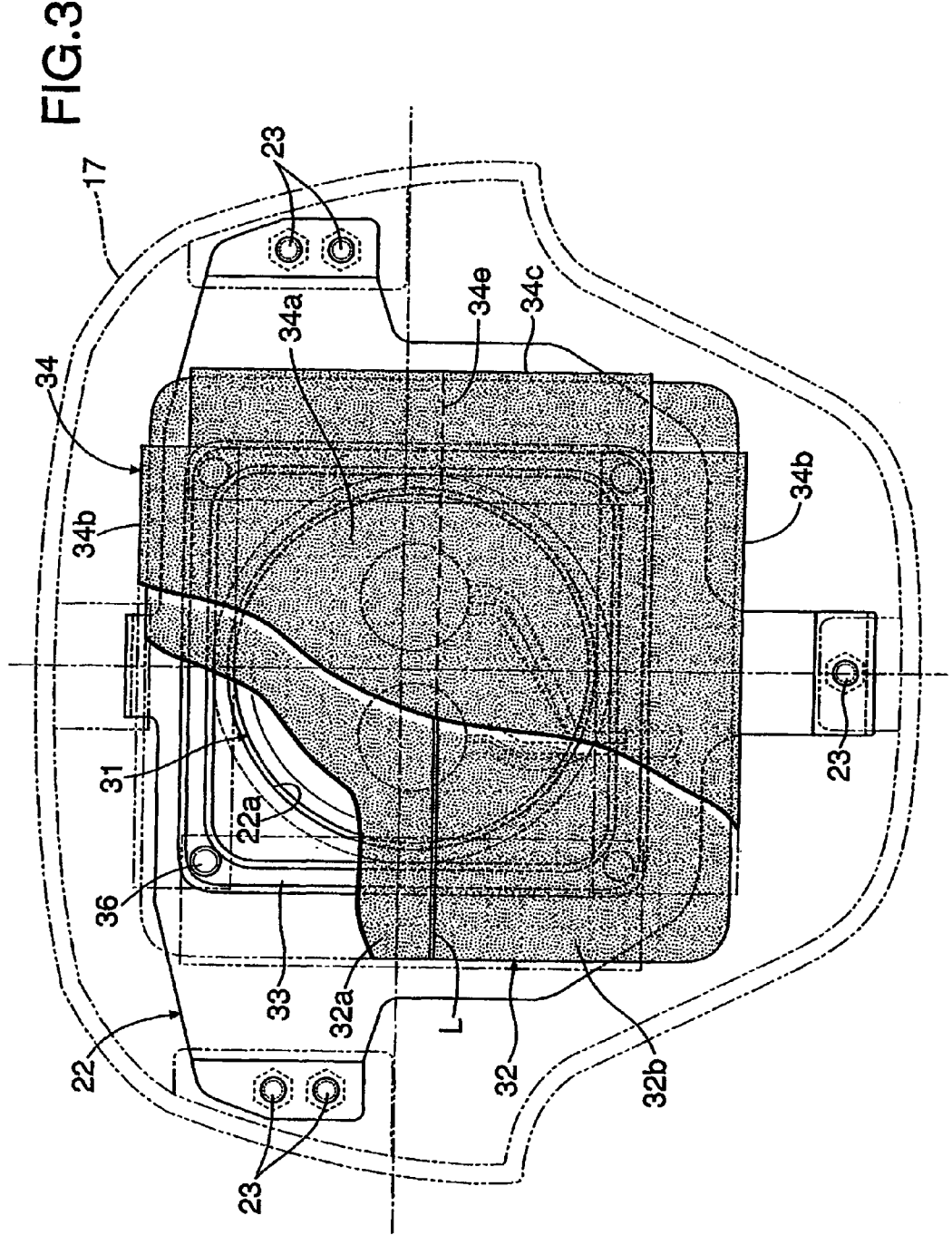

As shown in FIGS. 2 and 3, the steering wheel 12 includes a boss portion 16 fixed to a rear end of a steering shaft 14 by a nut 15, a front cover 17 fixed to the boss portion 16, a rear cover 19 fixed to a rear surface of the front cover 17 by bolts 18, a plurality of spoke portions 20 extending radially from the front cover 17, and an annular steering wheel body 21 connected to outer peripheries of the spoke portions 20. A retainer 22 is fixed to an inner peripheral surface of the rear cover 19 by five bolts 23 and five nuts 24, and the air bag module 13 is supported on the retainer 22.

The air bag module 13 includes an inflator 31 filled with a propellant adapted to generate a high-pressure gas by burning, an air bag 32 formed by stitching a base fabric, and a square-shaped fixing ring 33 for fixing a base portion of the air bag 32. A flange 31a provided around an outer periphery of the inflator 31 is fixed to a front surface of a circular opening 22a in the retainer 22 by welding. A base portion of a retaining member 34, the base portion of the air bag 32 and a base portion of a protecting member 35 are superposed together on and commonly clamped to a rear surface of the opening 22a in the retainer 22 by common bolts 36 and nuts 37.

The retaining member 34 functions to envelope substantially the entire air bag 32 in a folded state and to prevent the air bag 32 from losing its shape. The protecting member 35 is interposed between the inflator 31 and the air bag 32 and functions to prevent the air bag 32 from being damaged by a high-temperature gas generated by the inflator 31.

Figure 4:
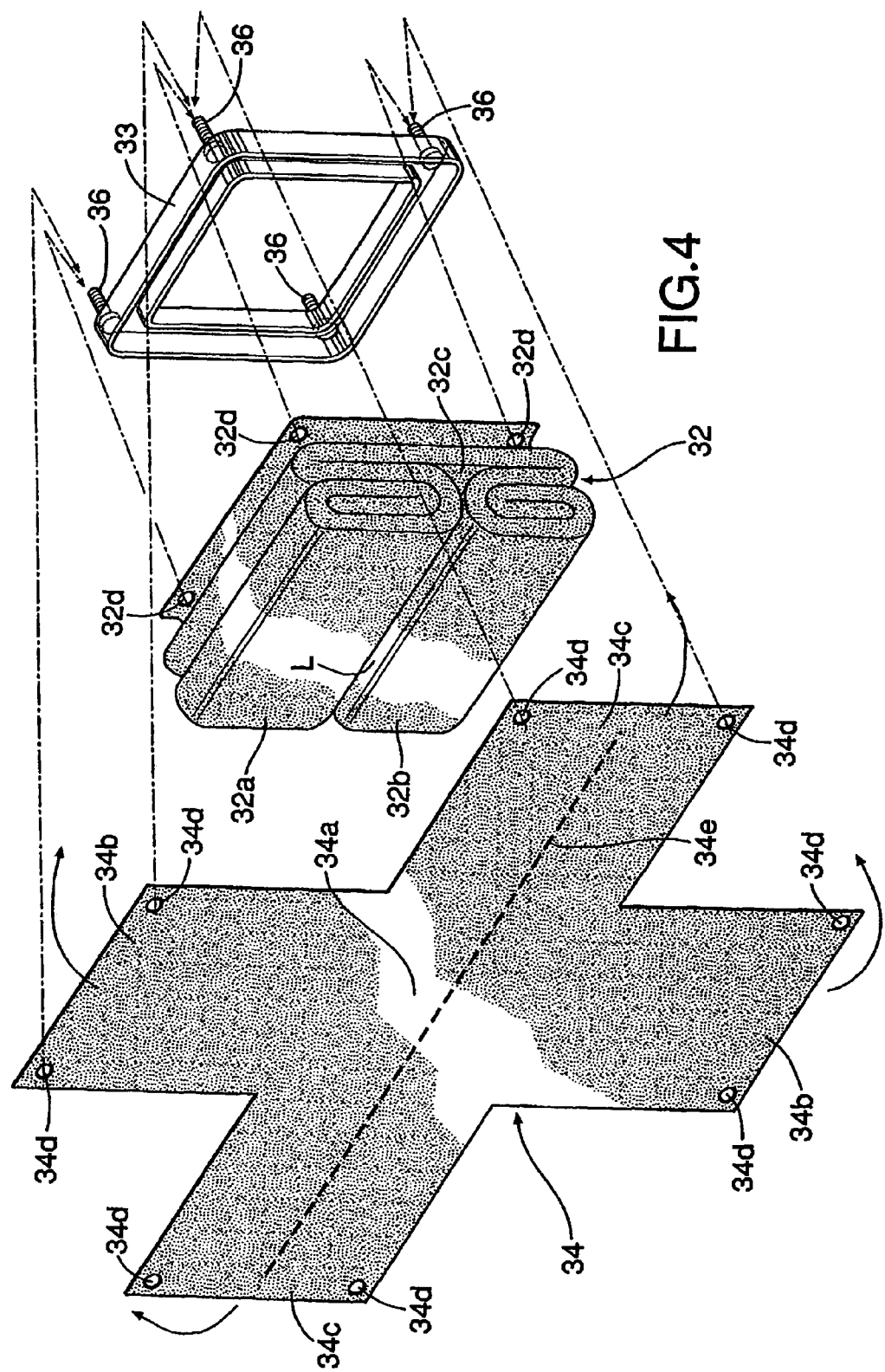

As shown in FIGS. 3 and 4, the air bag 32 in the folded state is divided into an upper block 32a and a lower block 32b by a phantom dividing line L extending in a lateral direction. A base fabric is folded up in a convoluted shape or a bellows-shape in each of the upper block 32a and the lower block 32b. As a result, when the air bag 32 is deployed, an occupant-restraining face 32c (see FIG. 5C) for restraining a head or chest of an occupant is hidden inside a central portion of the air bag 32 in the folded state and hence, is in a state in which it is not visible from the outside. Four bolts bores 32d are formed in the base portion of the air bag 32 formed in a bag-shape, namely, in a peripheral region around the opening through which the gas is supplied.

The retaining member 34 includes a central portion 34a, a pair of upper and lower protrusions 34b, 34b projecting upwards and downwards from the central portion 34a, and a pair of left and right protrusions 34c, 34c projecting leftwards and rightwards from the central portion 34a. Two bolt bores 34d, 34d are formed in each of the tip ends of the upper and lower protrusions 34b, 34b and tip ends of the left and right protrusions 34c, 34c, and a breaking portion 34e comprising a single straight perforated line is formed to extend in the lateral direction over the left and right protrusions 34c, 34c and the central portion 34a.

Thus, in a state in which the four bolts 36 embedded in four corners of the fixing ring 33 have been fitted into the bolt bores in the base portion of the protecting member 35 (see FIG. 1), the bolt bores 32d of the air bag 32 and the bolt bores 34d in the retaining member 34, the bolts 36 are inserted through bolt bores (not shown) in the retainer 22 and fastened by the nuts 37. This causes substantially the entire air bag to be covered by the retaining member 34 while in the folded state, thereby maintaining the air bag in the folded state and preventing it from being collapsed. In this state, the dividing line L for the upper block 32a and the lower block 32b of the air bag 32 in the folded state extends in the lateral direction along a rear face of the folded air bag, and in the longitudinal direction along opposite sides of the folded air bag, and the breaking portion 34e of the retaining member 34 is formed to extend along the dividing line L.

The operation of the exemplary embodiment of the present invention having the above-described arrangement will be described below.

When an acceleration or deceleration equal to or larger than a predetermined value has been detected upon collision of a vehicle, the inflator 31 is ignited, and when the folded air bag 32 starts to be expanded by the gas generated by the inflator 31, the breaking portion 34e formed on the retaining member 34 is broken and, at the same time, a tear line (not shown) formed on the rear cover 19 is broken, whereby the air bag 32 is deployed into a vehicle compartment through openings formed in the rear cover.

Figure 5A:
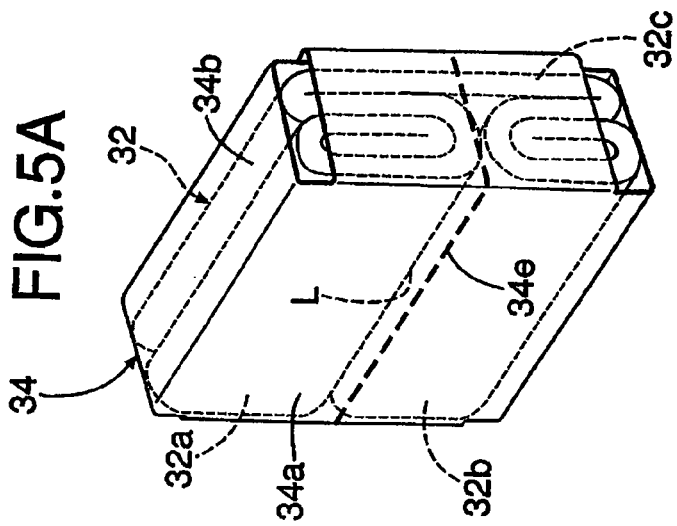
FIGS. 5A, 5B and 5C are views for explaining the operation during deploying of the air bag according to the exemplary embodiment of the present invention.
Figure 5B:
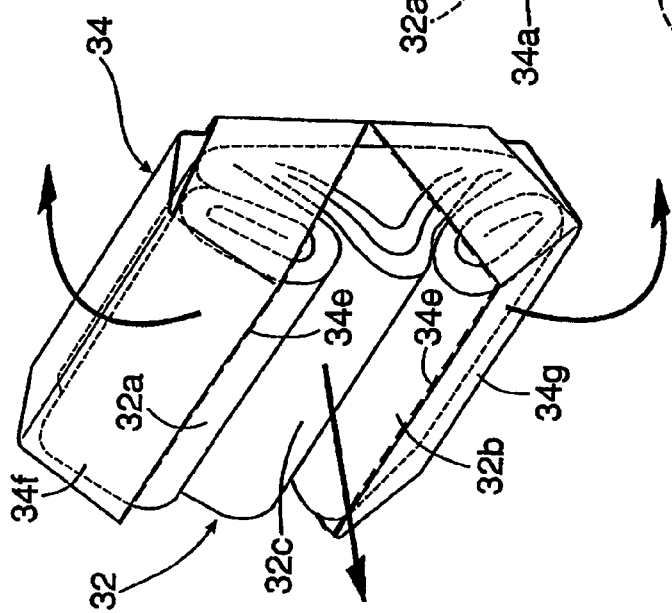
Figure 5C:
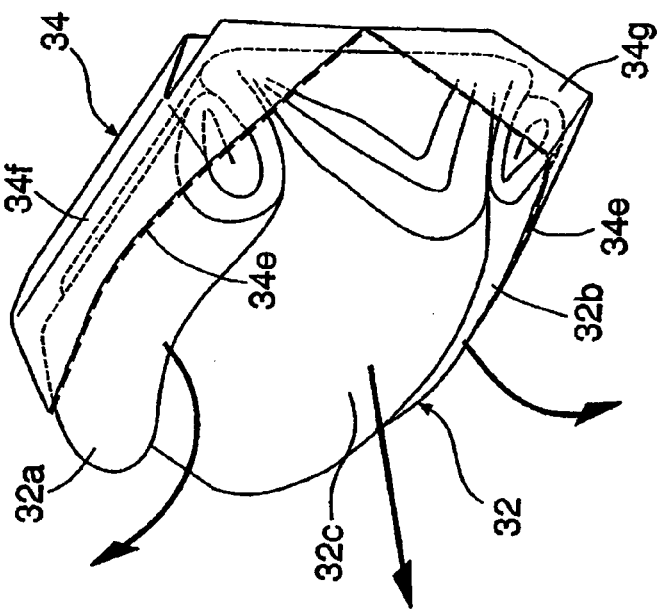
Figure 6A:
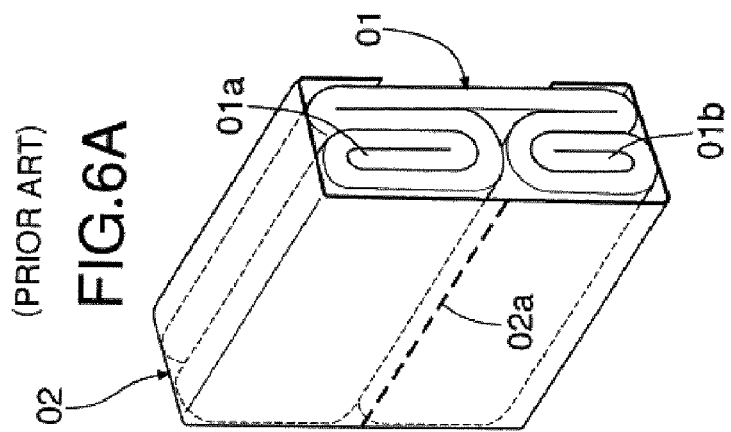
FIGS. 6A, 6B and 6C are views for explaining the operation during deploying of a conventional air bag.
Figure 6B:
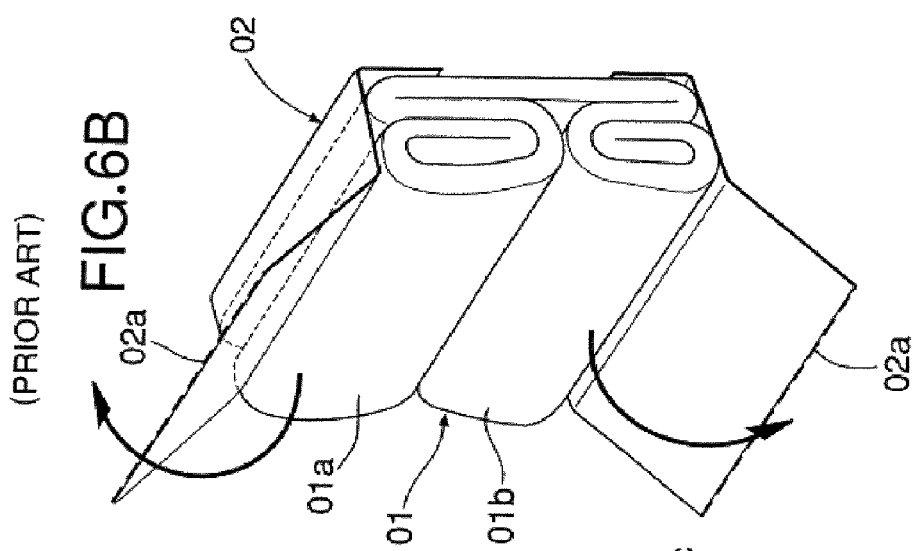
Figure 6C:
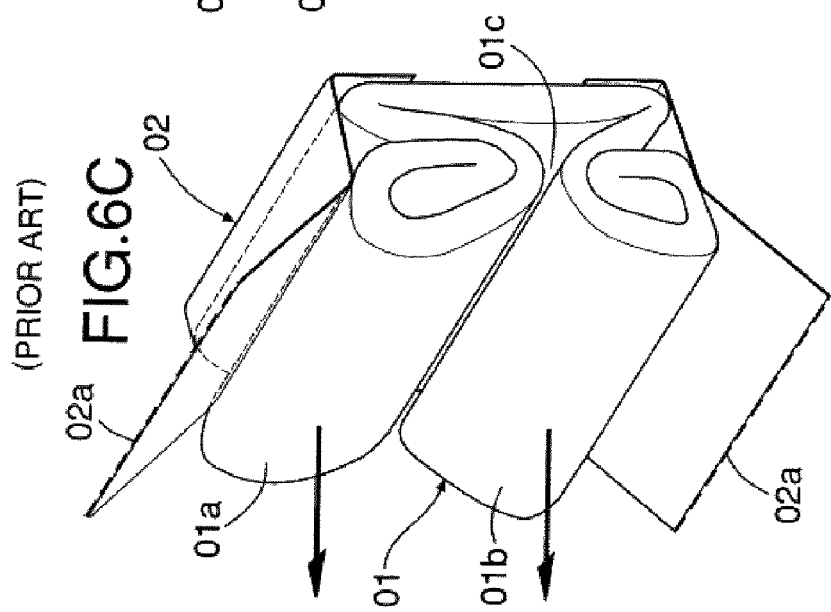

FIGS. 5A-C show a course of deployment of the air bag 32. When the gas is supplied from the inflator 31 into the folded air bag 32 before deployment in the state shown in FIG. 5A, this starts the deployment. Specifically, the breaking portion 34e of the retaining member 34 is broken by a deployment pressure, whereby the retaining member 34 is opened in such a manner that the retaining member 34 is divided into an upper deployment-inhibiting portion 34f covering the upper block 32a of the air bag 32 and a lower deployment-inhibiting portion 34g covering the lower block 32b of the air bag 32 with the breaking portion 34e as a boundary, as shown in FIG. 5B. The upper and lower deployment-inhibiting portions 34f, 34g may be tray-shaped with longer sides extending in the lateral direction and shorter ends extending in the longitudinal direction, and a depth substantially the same as that of upper and lower blocks 32a, 32b of the air bag. At this time, the upper block 32a of the air bag 32 is locked into and retained by the upper deployment-inhibiting portion 34f and thus inhibited from being deployed toward the driver, while the lower block 32b is similarly locked into and retained by the lower deployment-inhibiting portion 34g and thus inhibited from being deployed toward the driver. As deployment of the air bag progresses, the upper block 32a and the lower block 32b, retained in the upper and lower deployment-inhibiting portions 34f, 34g, are rotated in directions vertically away from each other with the phantom dividing line L as a boundary.

As a result, the occupant-restraining face 32c of the air bag 32 which was hidden inside the folded air bag is now exposed, as shown in FIG. 5C and hence, the occupant-restraining face 32c of the air bag 32 can be deployed rearwards toward the driver at the very beginning of deployment to effectively restrain a driver, and it is possible to prevent the outer periphery of the air bag 32 from being brought into contact with the driver, while remaining in an incompletely deployed state. When the deployment of the air bag 32 has sufficiently progressed, the upper block 32a and the lower block 32b of the air bag 32 are unlocked and freed completely from the upper deployment-inhibiting portion 34f and the lower deployment-inhibiting portion 34g and can then be deployed freely.

Although the exemplary embodiment of the present invention has been described in detail, it will be understood that various modifications in design may be made without departing from the spirit and scope of the invention.

For example, in the exemplary embodiment, the air bag 32 in the folded state is divided into the upper block 32a and the lower block 32b, but the air bag 32 can be divided in any direction, for example, into a right block and a left block.

What is claimed is:

1. An air bag system comprising an air bag folded so that an occupant-restraining face thereof which restrains an occupant upon deployment of the airbag is hidden inside a central portion of the folded air bag, and a retaining member which covers said folded air bag, wherein said retaining member includes an outer face, a plurality of side portions, each side portion disposed on a side of the outer face, and a breaking portion along which the retaining member breaks, said breaking portion extending across said outer face and an opposing pair of said side portions, said air bag is deployed by breaking the breaking portion of said retaining member, when said breaking portion breaks, said retaining member is opened so that it is divided into a plurality of deployment-inhibiting portions, and the plurality of deployment-inhibiting portions are brought into engagement with an outer peripheral portion of the air bag deployed from the folded state to delay the deployment of said outer peripheral portion.

2. The air bag system of claim 1, wherein the plurality of deployment-inhibiting portions retains sections of the outer peripheral portion of the folded air bag respectively disposed therein to inhibit deployment of the sections of the outer peripheral portion of the folded air bag.

3. The air bag system of claim 2, wherein the sections of the folded air bag retained in portions of the retaining member rotate away from each other when the breaking portion of the retaining member breaks, permitting the occupant-restraining face of the air bag to be deployed from between the sections of the folded air bag which have rotated away from each other.

4. The air bag system of claim 3, wherein after the occupant-restraining face of the air bag is deployed, the sections of the folded air bag which have rotated away from each other are then freed from the deployment-inhibiting portions of the retaining member and deployed.

5. The air bag system of claim 1, wherein the deployment-inhibiting portions of the retaining member are substantially tray-shaped when the breaking portion breaks.

6. The air bag system of claim 1, wherein the retaining member is shaped as a cross with four arms that are each wrapped around the folded air bag.

7. The air bag system of claim 1, wherein the breaking portion extends in a lateral direction of the air bag such that the retaining member is divided into upper and lower deployment-inhibiting portions when the breaking portion breaks.

8. The air bag system of claim 1, wherein at the time of deployment, an upper portion of the folded air bag is locked to an upper deployment-inhibiting portion of the retaining member and a lower portion of the folded air bag is locked to a lower deployment-inhibiting portion of the retaining member.

9. An air bag system comprising an air bag folded so that an occupant-restraining face thereof which restrains an occupant upon deployment of the airbag is hidden inside a central portion of the folded air bag, and a retaining member which covers said folded air bag,
wherein said retaining member includes a breaking portion along which the retaining member breaks, said air bag is deployed by breaking the breaking portion of said retaining member,
wherein the system is configured such that when the breaking portion breaks, the retaining member is opened and divided into a plurality of deployment-inhibiting portions, and the plurality of deployment-inhibiting portions are brought into engagement with an outer peripheral portion of the air bag deployed from the folded state to delay the deployment of said outer peripheral portion,
wherein the retaining member is shaped substantially as a cross with four arms that are each wrapped around the folded air bag,
wherein the breaking portion extends through an opposing two of the arms of the retaining member, and wherein the retaining member is configured to be divided into two deployment-inhibiting portions when the breaking portion breaks.

10. An air bag system comprising an air bag folded so that an occupant-restraining face thereof which restrains an occupant upon deployment of the airbag is hidden inside a central portion of the folded air bag, and a retaining member which covers said folded air bag,
wherein said retaining member includes a breaking portion along which the retaining member breaks, said air bag is deployed by breaking the breaking portion of said retaining member,
when said breaking portion breaks, said retaining member is opened so that it is divided into a plurality of deployment-inhibiting portions, and the plurality of deployment-inhibiting portions are brought into engagement with an outer peripheral portion of the air bag deployed from the folded state to delay the deployment of said outer peripheral portion,
wherein the deployment-inhibiting portions of the retaining member are substantially tray-shaped when the breaking portion breaks, and
wherein the retaining member is shaped as a cross with four arms that are each wrapped around the folded air bag.

11. The air bag system of claim 10, wherein the retaining member includes a central portion, a pair of upper and lower arms projecting upwards and downwards from the central portion, respectively, and a pair of left and right arms projecting leftwards and rightwards from the central portion, respectively, wherein the breaking portion extends in a lateral direction across the left and right arms and the central portion.

12. The air bag system of claim 10, wherein the breaking portion extends through an opposing pair of the arms of the retaining member, and the retaining member is divided into two deployment-inhibiting portions when the breaking portion breaks.

13. The air bag system of claim 10, wherein the plurality of deployment-inhibiting portions retains sections of the outer peripheral portion of the folded air bag respectively disposed therein to inhibit deployment of the sections of the outer peripheral portion of the folded air bag.

14. The air bag system of claim 13, wherein the sections of the folded air bag retained in the deployment-inhibiting portions of the retaining member rotate away from each other when the breaking portion of the retaining member breaks, permitting the occupant-restraining face of the air bag to be deployed from between the sections of the folded air bag which have rotated away from each other.

15. The air bag system of claim 14, wherein after the occupant-restraining face of the air bag is deployed, the sections of the folded air bag which have rotated away from each other are then freed from the deployment-inhibiting portions of the retaining member and deployed.

16. The air bag system of claim 10, wherein the breaking portion extends in a lateral direction of the air bag such that the retaining member is divided into upper and lower deployment-inhibiting portions when the breaking portion breaks.

17. The air bag system of claim 10, wherein at the time of deployment, an upper portion of the folded air bag is locked into an upper deployment-inhibiting portion of the retaining member and a lower portion of the folded air bag is locked into a lower deployment-inhibiting portion of the retaining member.

18. The air bag system of claim 10, wherein when said breaking portion breaks, the plurality of deployment-inhibiting portions delay the deployment of said outer peripheral portion without inhibiting deployment of the occupant restraining face of the air bag.

* * * * *